United States Patent [19]

Gritter

[11] Patent Number: 4,825,132
[45] Date of Patent: Apr. 25, 1989

[54] CURRENT MODE MOTOR CONTROL
[75] Inventor: David J. Gritter, Racine, Wis.
[73] Assignee: Eaton Corporation, Cleveland, Ohio
[21] Appl. No.: 52,340
[22] Filed: May 21, 1987
[51] Int. Cl.$^4$ ................................................ H02P 5/40
[52] U.S. Cl. ........................................ 318/811; 363/42
[58] Field of Search .................... 363/39, 42; 328/165; 318/811

[56] References Cited
U.S. PATENT DOCUMENTS
3,971,972 7/1976 Stich .................................... 318/811

Primary Examiner—David Smith, Jr.
Attorney, Agent, or Firm—C. H. Grace

[57] ABSTRACT

A field-oriented controller for a 3 phase induction motor is powered by a dc power source through a static inverter. Current reference signals are compared with current feedback to produce error signals. They are amplified by a proportional plus integral amplifier, whose output goes to a threshold comparator having negligible hysteresis. Flip-flops, through which the threshold comparators' gating signal outputs are fed, are clocked at a fixed frequency to introduce pseudo-randomness into the gating times. This reduces apparent acoustic noise of the motor. Asymmetrical anti-overlap delays for the gating signals are made long enough to serve also as the principal means for limiting the maximum frequency of gating. Locking circuitry overrides the proportional integral error signal in one phase at a time, and holds the inverter's gating in one switching state throughout the approximate middle 60° interval of each phase. During each such 60° locking interval, the integration capacitor of that phase's proportional plus integral error amplifier is short circuited to prevent motor current transients at the end of the interval. The locking circuitry is disabled at very low speeds.

11 Claims, 11 Drawing Sheets

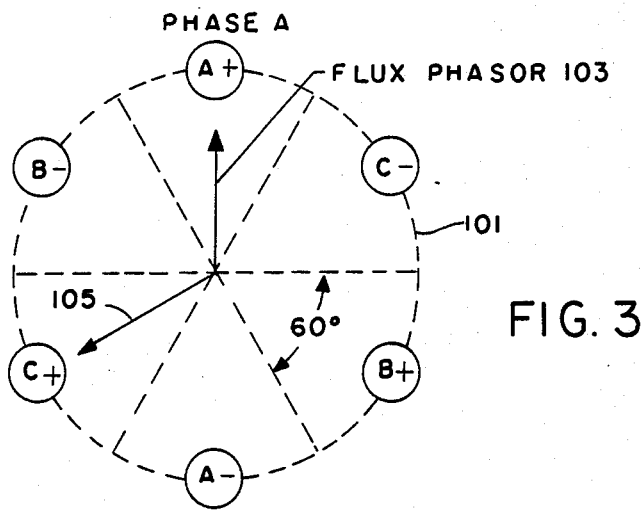
FIG. 3
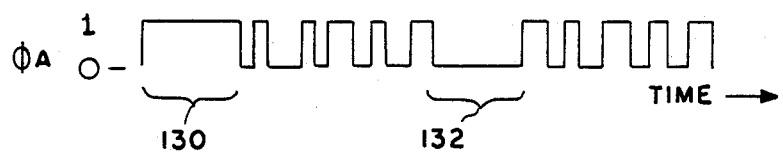
FIG. 5A
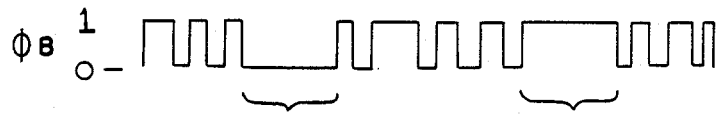
FIG. 5B
FIG. 5C
FIG. 5

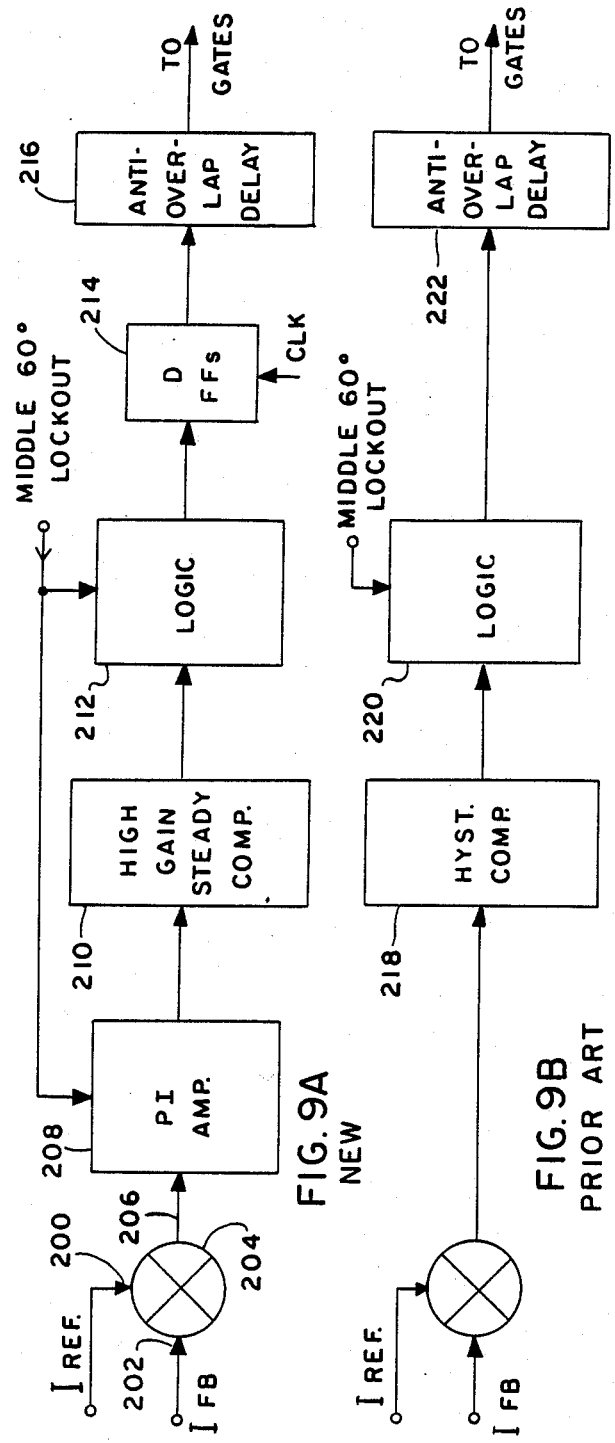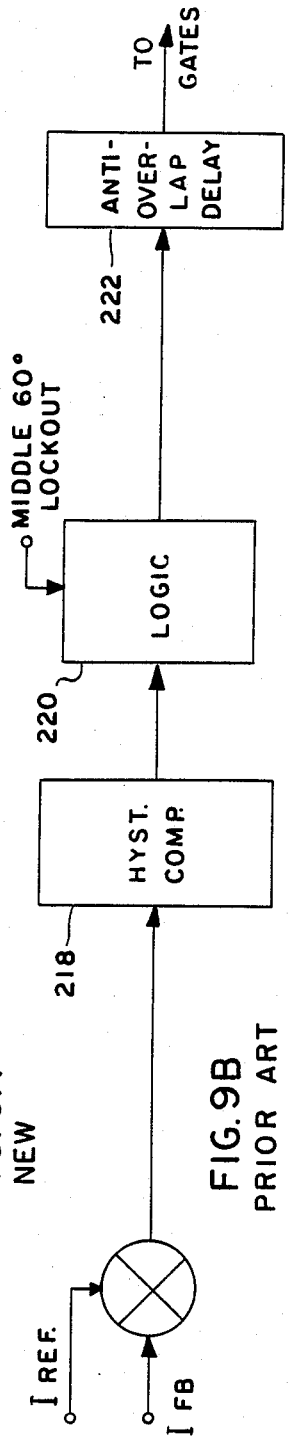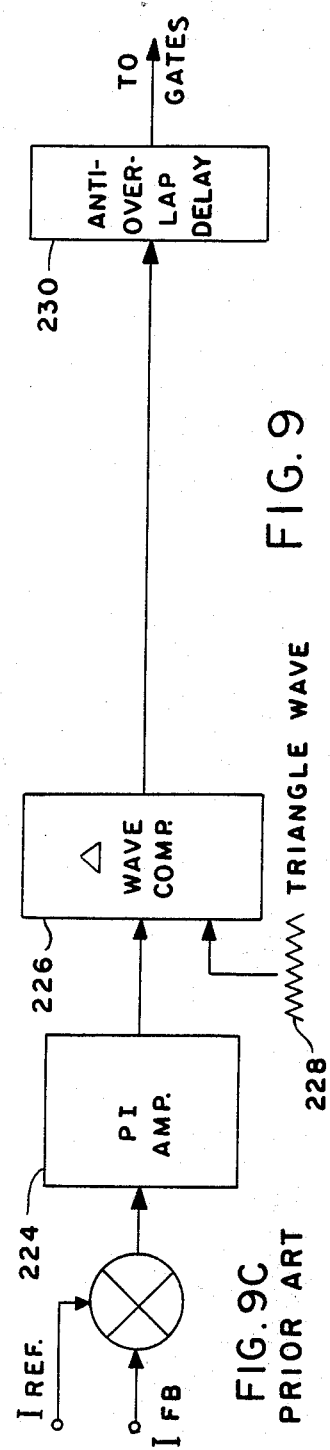
FIG. 9A NEW  FIG. 9B PRIOR ART  FIG. 9C PRIOR ART
FIG. 9

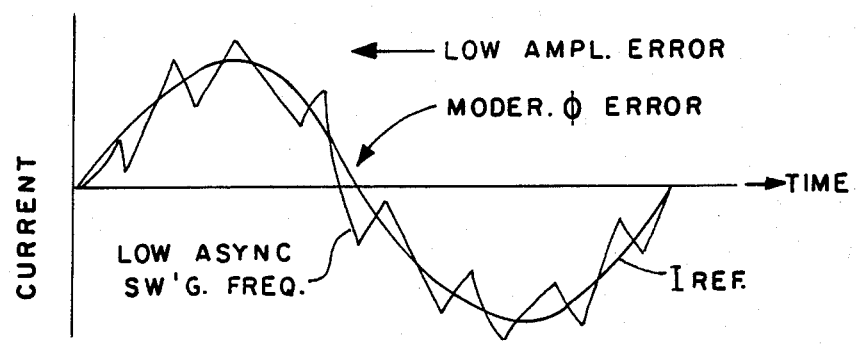
FIG. 10A
NEW
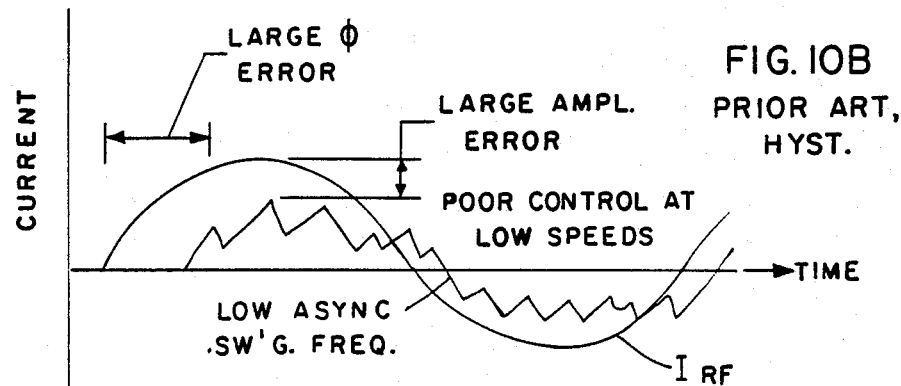
FIG. 10B
PRIOR ART,
HYST.
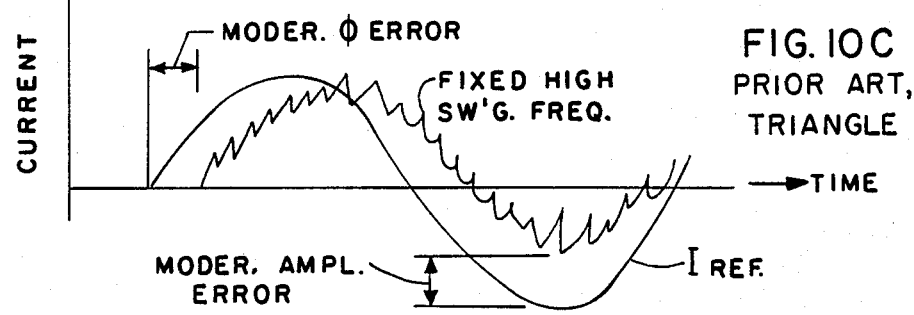
FIG. 10C
PRIOR ART,
TRIANGLE
FIG. 10

WITH INTEGRATOR

A CUR. REF.
B CUR. ERROR

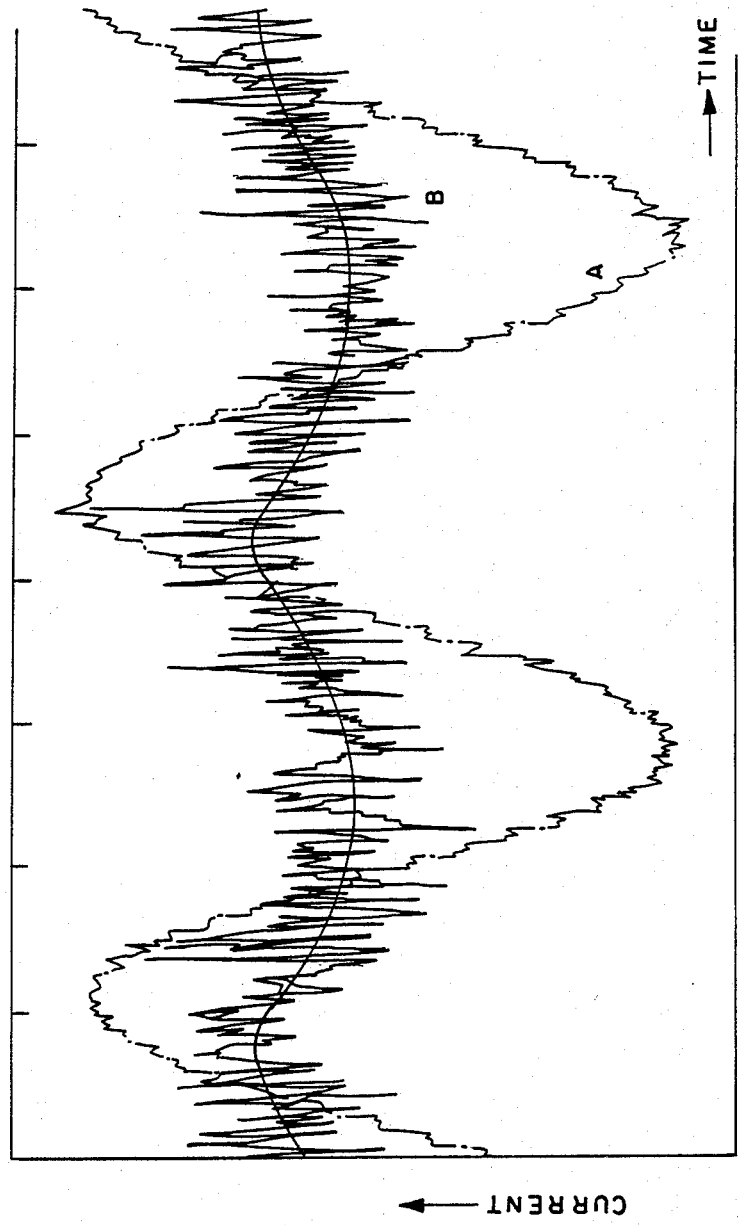

CURRENT MODE MOTOR CONTROL

FIELD

The present invention relates to current mode controllers for controlling AC motors that are powered through static inverters by DC power sources such as batteries or rectified line voltage.

BACKGROUND

DC motor systems have ordinarily been used where high performance, low cost electric drives are required, as in the propulsion systems of electric vehicles. Although DC motors themselves are relatively complex, high performance controllers for them are simpler and less expensive than those for AC motors. AC motors themselves are generally of simpler structure and have the advantages of lower cost, compact size, low weight, and high efficiency, but their controllers are complex and expensive.

The cost of the inverters that are required for providing controlled power to AC motors from storage battery sources is expected to decrease as inverter systems come into greater use. For the future, therefore, the principal problem impeding the adoption of AC motors for such applications as electric vehicle drive systems is the relatively poor operating performance of the AC controller and inverter apparatus that are ordinarily used for supplying power to the AC motors.

Current mode control for operating polyphase AC motors may result in logic simplification. The current flowing into the motor terminals has been measured, and compared with current reference signals that were generated by a controller. The resulting error signals have been employed to control the switching of a polyphase inverter by gating the main semiconductors (often transistors) of the inverter on and off. Pulse-width-modulated burst of voltage from the DC power source are in that way rapidly switched about to appropriate phase terminals of the AC motor. A squirrel cage induction type of AC motor is favored for such applications because of its reliability, simplicity, and low cost.

A further important improvement in the control of AC motors is "field-oriented control", which will be discussed below. Field-oriented control is described in published technical literature, for example in the following publication:

Kaufman, George; Garces, Luis; and Gallagher, Gerard, "High Performance Servo Drives For Machine-Tool Applications Using AC Motors". Institute of Electrical and Electronic Engineers, IAS Annual Meeting Conference Record, PP 604-609, 1982.

Current mode controllers have been of two principal types: One was the hysteresis regulator: the other was a naturally sampled triangular wave comparison regulator with proportional plus integral error control. Numerous variations of these types have also been employed with greater or less success. Descriptions of these two prior art control systems have been deferred herein to the end of the Detailed Description of the present invention, in order that important differences between the present invention and the two main prior art systems could be more clearly described.

SUMMARY

An object of the invention is to provide a current mode controller for a polyphase motor such as a three-phase squirrel cage motor, in which a proportional plus integral error amplifier is combined with a high-gain comparator having substantially no hysteresis. Combinational logic circuits drive the gates of inverter transistors. The logic circuits have the feature of locking the switching state of one phase at a time during two 60-degree phase intervals of each complete electrical cycle. During the locking intervals of a phase the current feedback error signal is disregarded and the unused current error integrator is held in a reset condition, i.e., disabled. The timing of gating signals for the inverters is intentionally gated asynchronously, to reduce acoustic noise of the motor. Anti-overlap delays in the gate triggering circuits are set so as to limit the maximum frequency of switching of the inverter transistors.

BRIEF DESCRIPTION OF DRAWINGS

FIG. 3 is a phase diagram showing 60° segments of one cycle of the current controller.

FIG. 5 depicts waveforms of the three phases of the control module's output signals, to illustrate 60° intervals of locked control by the microprocessor.

FIGS. 9A, 9B and 9C are simplified block diagrams showing some of the differences between the invention and two prior art systems.

FIGS. 10A, 10B and 10C compare the types of performance that can be expected from the invention of FIG. 9A and the two prior art systems of FIGS. 9B and 9C.

FIGS. 11A and 11B are oscillograms of the output currents of the invention and the prior art system of FIG. 9B respectively.

DETAILED DESCRIPTION

Figure 1:
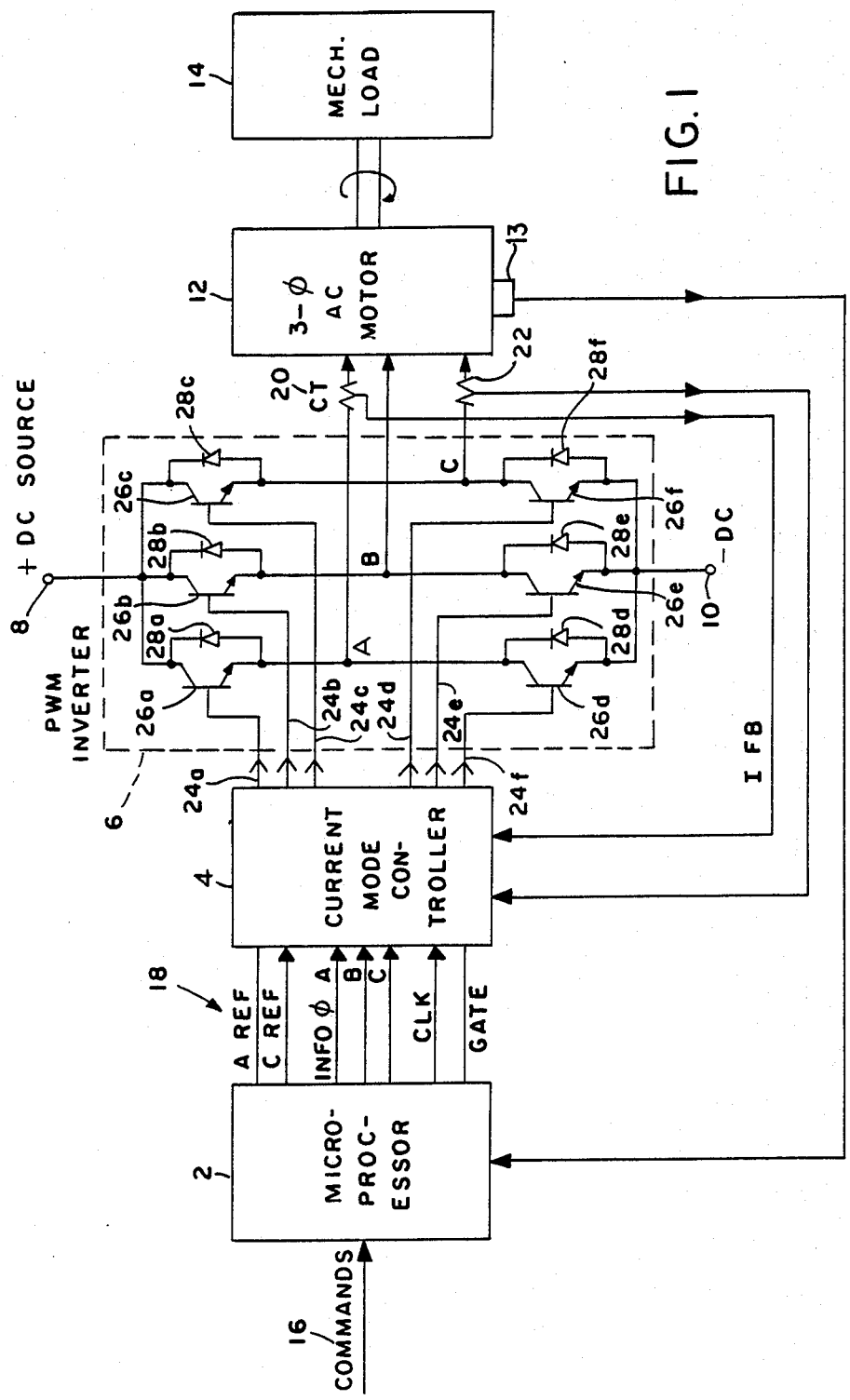
FIG. 1 is a simplified block diagram of a preferred embodiment of the invention.

Current mode control involves generating a motor current reference for comparison with actual instantaneous motor current. The difference or error signal is fed to a circuit which generates gating signals for the static inverter. FIG. 1 shows the scheme, which involves a microprocessor 2, a current mode controller 4, a pulse width modulated inverter 6, a DC power source whose positive and negative terminals are designated 8 and 10 respectively, and a three-phase squirrel cage motor 12 in the particular embodiment being described, which is a preferred embodiment of the invention. Commands 16 are entered into the microprocessor 2, which generates polyphase current reference signals 18. The reference signals are connected to the current mode controller 4, along with feedback current signals 21 that are derived from, in this case, two current transformers 20, 22, which sense the actual currents in two of the three phase wires of the motor 12. In the absence of a neutral motor wire the current in the third phase wire of the motor can be determined from the current measurements of the other two wires. The microprocessor 2 also receives rotor position feedback information from an optical encoder in a sensor 13.

The controller 4 provides output signals on conductors 24a, b, c, d, e, f, to the gates of the inverter transistors 26a, b, c, d, e, f, respectively, as in the prior art. The collectors of the NPN transistors 26a, b, c, are connected to the positive terminal 8 of the DC power source, which is often a rectified and filtered AC power source. The emitters of the transistors 26a, b, c are connected to the armature phase terminals A, B, C, respectively of the motor 12. Similarly, the emitters of the transistors 26d, e, f, are connected to the negative terminal 10 of the DC power source, and their collectors are connected respectively to the phase terminals A, B, C, of the motor 12. Free-wheeling diodes 28a, b, c, d, e, f, are connected in back-to-back relationship with the transistors 26a–26f, as shown in FIG. 1. Phases A and C are equipped with the current transformers 20,22.

With the aid of the foregoing overview of the system, some of the important problems which must be solved to produce a high-performance current mode controller will be identified:

1. The frequency with which the inverter transistors 26a–26f are attempted to be switched on and off must be constrained within the limits of the switching speed capabilities and the maximum permissible power dissipation ratings of the transistors themselves.

2. The current regulation (i.e., the ability to force the actual motor current to follow the reference) must be adequate for the requirements of the drive application.

3. The controller must operate without any superfluous degrees of freedom, to prevent unpredictable changes in the gating sequences of the inverter 6.

4. The acoustic noise of the system, produced principally by magnetic circuits of the motor 12, should be minimized to the extent possible by design of the controller. These problems will be discussed briefly first, to facilitate a subsequent description of the details and advantages of the invention.

The control circuit 4 which generates the signals that gate the inverter transistors 26a–26f on and off must constrain the switching frequency below a permissible limit. If the switching frequency is too low, however, the actual motor current only roughly approximates the current references 18. For example, the motor current may follow only the average value of a phase's reference, and exhibit a large triangular or saw-tooth ripple component that is roughly centered on the reference; the magnitude of the ripple may vary inversely with the switching frequency.

As to current regulation, the motor current does not follow the reference current precisely under any operation conditions. In particular, however, when the speed voltage of the motor (i.e., the "back EFM") approaches the magnitude of the DC bus voltage 8.10 there is often a tendency for current mode controllers to operate with unacceptably high errors of both the amplitude and phase of the actual motor current. In controllers having high loop gain, the error may be associated with the fact that the DC voltage available (via the inverter) is limited and is not able to slew the actual motor current rapidly enough for good control. In controllers of relatively low loop gain, the error is large and relatively more predictable.

It is desirable that the controller 4 not have superfluous degrees of freedom in gating the inverter. In the absence of a neutral connection, as in FIG. 1, if two of the phase currents are regulated, the third will be also. However, three phases of gating signals must be generated. There are seven or eight possible useful states of conduction ("states") of the six transistors 26a–26f. An example of one such state is: transistors 26a, 26b, and 26f conducting, and transistors 26c, 26d, and 26e not conducting.

Commands to enter into all of these states cannot easily be generated with only two current feedback comparators, but when three current feedback signals are used there is redundant information, and the system has unnecessarily many degrees of freedom. For example, current could be forced in a correct direction by more than one possible state of the six transistors that comprise the inverter 6. In those circumstances, the state taken by the system may be influenced by system noise or other small disturbances, with a general lack of optimum control. The system may change periodically from a very low switching frequency mode of operation to a very high frequency switching mode. The foregoing problems are all addressed by the present invention.

In the present invention only two of the three phase motor currents are sensed for feedback purposes. The microprocessor 2 develops current reference signals specifying the currents that it is desired to deliver to the motor 12. The current mode controller 4 controls the voltage switches, i.e., the transistors, of the pulse width modulated inverter 6, in order to deliver the desired current to the motor.

The design of microprocessors of the general type of which microprocessor 2 is an example is well known in the prior art and will not be described again in detail here. The commands 16 can specify the desired instantaneous speed of rotation of the mechanical load 14. Alternatively, if desired, the commands 16 can be torque commands dictating the desired torque at the shaft connecting the motor 12 to the mechanical load 14.

Two of the outputs of the microprocessor 2 are generally sinusoidal current reference signals displaced 120 degrees apart, of equal but time varying amplitude and frequency. The current reference signals can conveniently be thought of as having two quadrature components, namely an excitation component, which is more less in phase with the motor flux, and a torque component. If a particular torque is desired the microprocessor computes and sets a particular slip for the motor. Torque is directly proportional to the slip, and is also proportional to the torque component of current.

The microprocessor 2 also generates three "locking signals" 19, one for each of the phases A, B and C. The locking signals are square waves which provide phase information for the controller 4, as is described in more detail below. The phases of the locking signals are based upon the rotor flux angle of the the motor, in accordance with the field-oriented control feature. The instantaneous angular position of the flux vector is the sum of the slip angle and the rotor's instantaneous mechanical position, the latter being indicated by the sensor 13.

The microprocessor 2 continually estimates the flux vector position in the machine. Conceptually, the estimate of the flux vector position is then used in the microprocessor to determine in which 60-degree sector the flux vector is located, (of the six sectors in a complete 360-degree electrical cycle of the motor). While the flux vector angle is between the upper and lower limits correspondig to a particular 60-degree sector, software establishes the phase of the three locking signals 19 so as to convey that sector's identity to the controller 4. Details of the utilization of the locking signals 19 are described below in connection with a description of the controller 4.

At low motor speeds the locking signals 19 are disabled by setting and holding all three of them to zero. The speed threshold below which the locking signals are disabled may be about 10% of rated speed. This disablement is preferably accomplished in the microprocessor by software. In the interest of adequate invention disclosure, however, it is stated here that the disablement can instead be done by passing each of the signals 19 through a respective two-input AND gate. The other input of each of the AND gates can be connected together to the output of a digital threshold comparator, whose output signal is a logic "one" at speeds above a predetermined threshold, and a logic "zero" at speeds below threshold. The speed of the motor is ascertainable from the half-period of the frequency command signal by counting the pulses of the system clock that occur during a half cycle. This count can be compared in the threshold comparator with a predetermined number.

Figure 2:
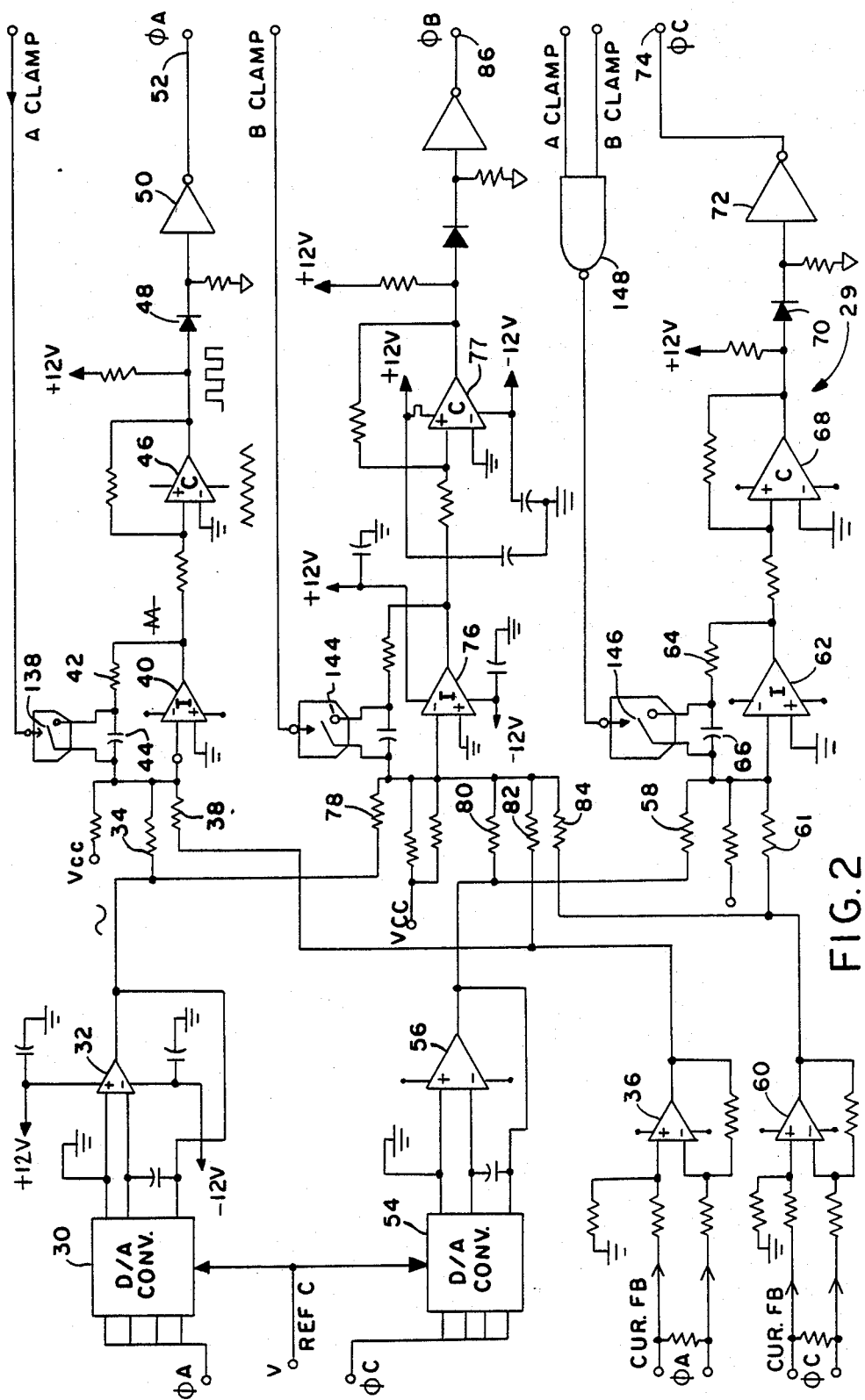
FIG. 2 is a schematic diagram of a current control module portion of the system of FIG. 1.
Figure 4:
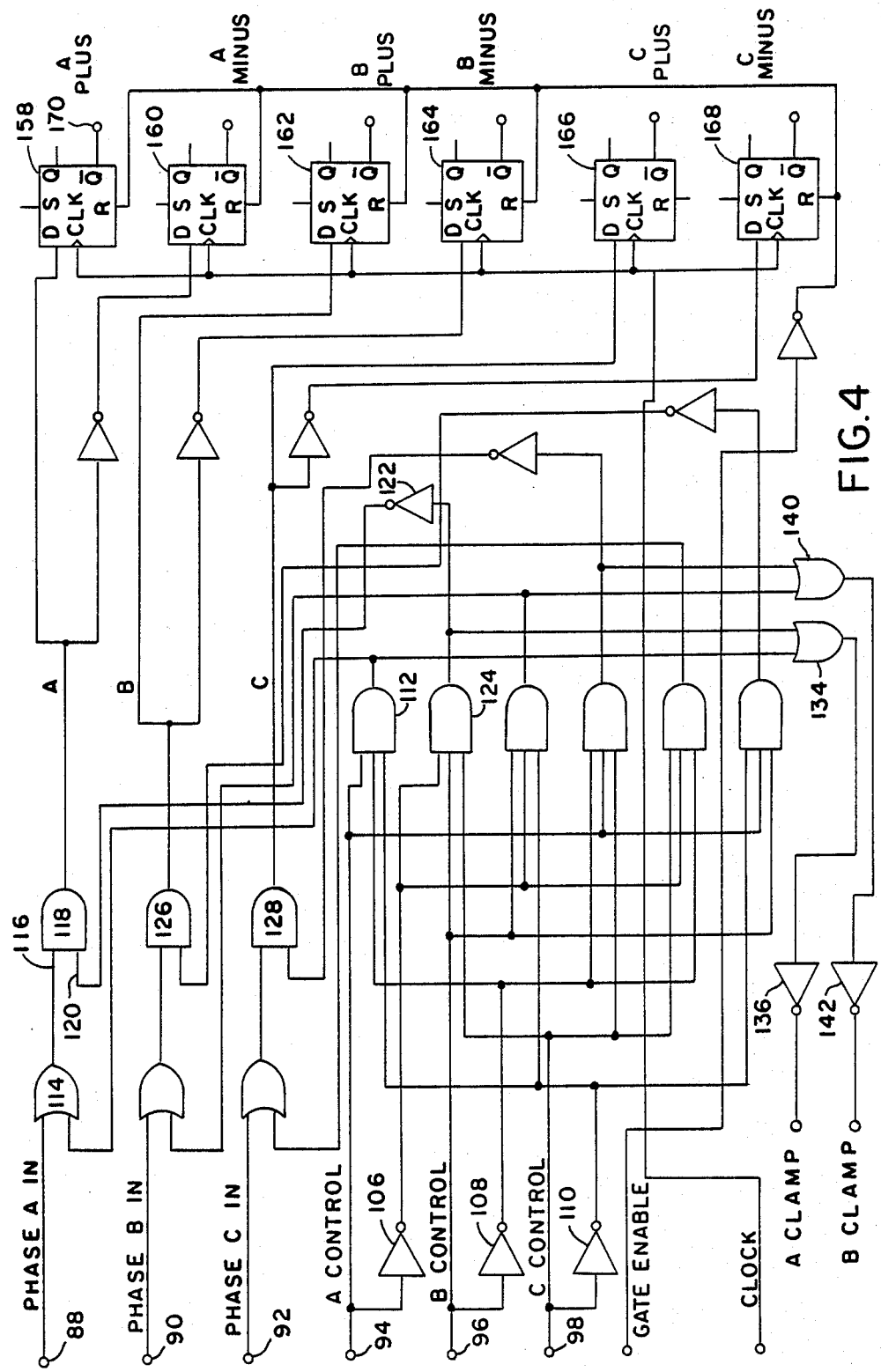
FIG. 4 is a programable logic array which is a portion of the controller.
Figure 7:
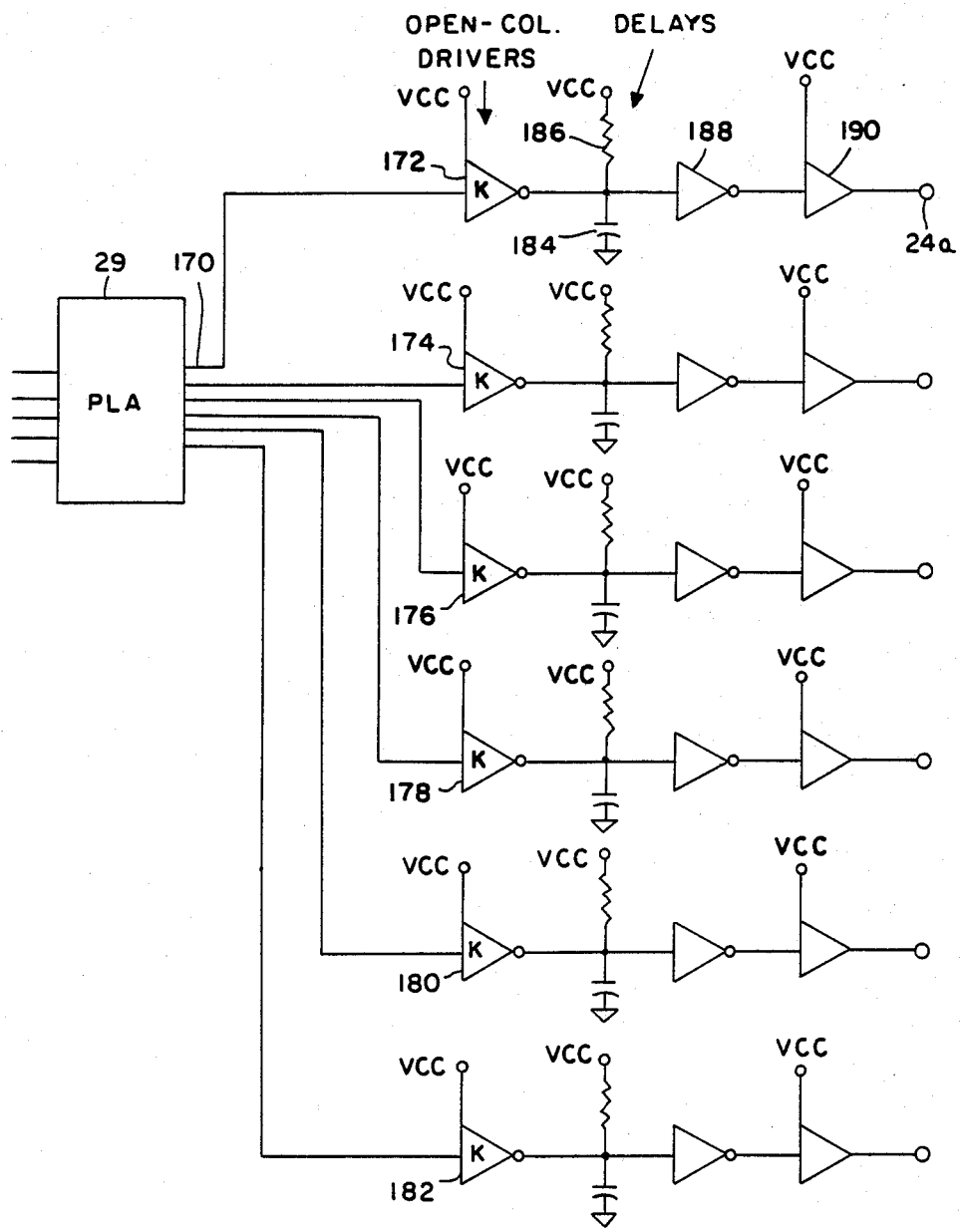
FIG. 7 shows driver circuits for the inverter gates, including their anti-overlap time delays.

The current mode control circuits are shown on FIGS. 2, 4 and 7. The digital current reference commands 18 for phase A are conducted to a digital-to-analog converter 30 of FIG. 2, where they are converted to an analog signal. It is amplified in an amplifier 32 and applied to a summing resistor 34. The wave form at the output of amplifier 32 is a frequently updated and therefore relatively smooth sign wave, which is the reference current for phase A.

A current feedback signal from the current transformer 20 is amplified by a differential amplifier 36, FIG. 2, and applied to another summing resistor 38. The feedback signal at the output of amplifier 36 is a generally jagged type of wave that ripples rapidly compared with the lobe changes of the fundamental waveform of amplifier 32. The summing resistors 34 and 38 are inputs of an error amplifier 40 for phase A, giving the algebraic sum of the reference current and feedback current signals.

Amplifier 40 is a proportional plus integral error amplifier because it has a feedback resistor 42 connected in series with a feedback capacitor 44. The output waveform from the integrating amplifier 40 is a generally saw-tooth shaped but non-periodic wave which is a combination of proportional and integral effects. It is proportional to error plus the integral of error.

The corner frequency of a Bode diagram for the proportional integrating amplifier 40 has its corner break point at a frequency several times the fundamental current feedback "frequency" frequency of the inverter but well below the switching frequency of the inverter. Starting at low frequencies the gain of this amplifier diminishes progressively to the break point frequency then continues with uniform gain to a relatively high frequency.

The output signal of 40 is connected to a comparator 46, which is a high-gain amplifier that is slammed alternately to its positive and negative saturation limits by the generally saw-toothed wave from amplifier 40. Its output, therefore, has a clipped non-uniform square waveform. The comparator 46 is intended to indicate at its output only the sign of the error signal. A minimal amount of hysteresis is included, for the sole purpose of providing noise rejection, but it is not enough to control the switching frequency. This, in combination with the other features, is a unique aspect of the present invention.

The output of 46 is applied through a diode 48 and an inverter 50 to produce a square output signal of irregular timing at a terminal 52 for phase A.

On FIG. 2 the circuits for phase C are identical with those for phase A. Briefly, a digital signal from the microprocessor 2 is received at converter 54, whose analog output is amplified in amplifier an 56 and applied to a summing resistor 58. The current feedback from transformer 22 is conducted to an amplifier 60, whose output is applied to a summing resistor 61. A proportional integrating amplifier 62 receives the signals from resistors 58 and 61 and amplifies and integrates their algebraic sum by means of feedback components 64 and 66 respectively. The resulting signal is applied to a comparator 68 whose output in turn is halfwave rectified in a diode 70 to form a clipped digital signal which is inverted in an inverter 72 and applied to an output terminal 74.

FIG. 2 also shows the preparation of a current error signal for phase B, for which no feedback current transformer is provided. A proportional integrating amplifier 76 for phase B receives inputs representing the phase A current reference, the phase C current reference, the phase A current feedback, and the phase C current feedback, at the summing resistors 78, 80, 82 and 84, respectively. The circuit for processing the error signal is the same for phase B as for phases A and C. It produces a processed error signal at an output terminal 86. An extra inverter is included in the signal path because the output of 76 is negative rather than positive error.

Error signals for the three phases, at terminals 52, 86 and 74, are connected to terminals 88, 90 and 92 of a programmable logic array (PLA), shown on FIG. 4.

In addition the three signals described above, the programmable logic array FIG. 4, which is part of the current mode controller 4, receives three signals from the microprocessor 2 to indicate the present 60-degree interval in which the controller is to lock one particular phase of the inverter to a particular switching state. This is the information that is based on the microprocessor's estimate of the present position of the motor's flux vector. The programmable logic array receives signals for this purpose related to phases A, B and C, on terminals 94, 96 and 98 respectively of FIG. 4. The information is employed in the programmable logic array to constrain the gating signals of one at a time of the three inverter phases to provide a fixed polarity (either positive or negative) during successive 60-degree intervals. This function can be visualized more easily with the aid of FIG. 3.

The large dashed circle 101 represents the 360 electrical degrees of one pair of poles of the motor 12. It is divided into six equal angular segments, each corresponding to a maximum positive or minimum negative sector of one of the three wire phases. The relative phases of the six maxima and minima of the three-phase voltages that are producible by the inverter can be represented by vectors drawn from the center of the circle 101 in the direction of the respectively marked small circles. Each such vector represents a switching state of the inverter. For example, the inverter output voltage maximum with positive polarity for phase C is represented by the vector 103. By way of further example, vector 104 is the voltage vector that the inverter produces when it is in a switching state in which the positive A transistor is conducting and the negative B and negative C transistors are conducting.

The vector 105 of FIG. 3 is related to the current error signals. The instantaneous direction and magnitude of the vector 105 are the direction and magnitude of correction voltage that the inverter would have to produce in order to bring the actual current at the motor vehicles toward the current that is specified by the input commands. For present purposes only the direction of vector 105 is of interest. The vector 105 rotates through the complete circle. During the time that the vector 105 traverses a particular sector, the corresponding phase of the inverter is constrained to stay in the particular switching state corresponding to that sector.

The purpose of the "commutating" 60-degree constraints (locking) of the inverter's gating signal states is to insure that when the invertor voltage required (to correct the actual current so as to equal the commanded current) is in a particular sector, for example, the A phase positive sector, the A phase positive transistor is turned on. The effect of this constraint is to insure that the motor current is not forced by transistor connections both to increase and decrease during that one 60-degree interval, but rather is forced by transistor connection in only one direction, and is allowed to free-wheel through a diode such as diode 28a in the other direction. This constraint reduces the switching frequency, the peak current amplitude, or both, as well as eliminating unnecessary degrees of freedom of the system.

Lockout control of this type is described in the following publication:

Inaguma, Y.; Asano, K.; Kisanuki, Y.; Takasu, K.; and Iwama, N.; of Toyota Central Research and Development Laboratories, Inc. Paper entitled "Development of Induction Motor Drive System for High Performance Electric Vehicles", delivered at 1985 Drive Electric, Italy, (Conference Record).

However, if the 60-degree lockign technique is used alone, it results in poor low-speed performance, because there is insufficient motor speed voltage (back EMF) at low speeds to cause the current to decrease sufficiently by free-wheeling. Thus the inverter switching frequency is reduced to a point where the actual motor current does not follow the current reference with sufficient accuracy.

In the system of the present invention an integrating amplifier (e.g. 40) is included for processing the current error. When the integrator is operative, an error signal that is too small itself to initiate corrective action in the inverter, is integrated so as to reach the level at which a corrective action is taken, after a time. Thus, in effect, a variable time limit is placed upon small errors, after which corrective action is taken, thereby reducing the average error. At very low speeds the 60-degree lockout feature is disabled as discussed above.

Thus, at any time only two of the three phases are controlled by current feedback error signals, and the current of the other phase is temporarily in an open-loop condition. The particular phase which is in an open-loop condition at any instant, and the polarity of that open-loop phase is determined by which of the 60-degree intervals of FIG. 3 is occupied at that instant by the vector 105. To say that the phase which is locked or constrained to remain in one state is in an open-loop condition means simply that the motor terminal for that phase is connected through a transistor (or free-wheeling diode) to the DC source throughout the 60-degree interval, with no change permitted in its switching. This constraint makes both the rate of change of current and the frequency of switching of the inverter relatively smaller.

At low speeds the back EMF is low enough that the controller's available voltage can overcome it with sufficient margin to force the actual current through a transistor to track the reference current faithfully. At high speeds the back EMF is so great relative to the available DC supply voltage that the controller cannot force the actual current through a transistor to follow the current reference faithfully. However, at high speeds a period of the fundamental frequency is so short that the current error that is introduced by locking one phase to the positive or negative terminal of the DC supply during a 60° interval is small. With lockout the inverter switching frequencies are considerably lower than they would be without the 60° lockout, so acoustic noise and inverter dissipation are reduced.

The present invention does not integrate the error signal in whichever phase is taking its turn for 60° lockout. The error comparator function can be thought of as having three states, namely, (a) fully high for locking to the positive DC supply terminal for 60 degrees of each cycle, (b) fully low for locking to the negative DC supply terminal during a different 60-degree time interval, and (c) 240 electrical degrees (two 120° segments) during which the comparator is controlled by an error signal which is the algebraic sum of a current reference command from the microprocessor and an actual current feedback signal.

Control signals for the 60° locking intervals are generated in the programmable logic array of FIG. 4. It is done by utilizing signals at terminals 94, 96 and 98, each of which has a logic "one" signal during 180° of the phases A, B and C, respectively and has a logic zero signal for the remaining 180° of each phase. For phase A the 180° square wave at terminal 94 is inverted in inverter 106; inverters 108 and 110 perform similar functions for phases B and C, respectively.

An AND gate 112 receives input signals corresponding to phase A from terminal 94, inverted phase B from the output of inverter 108 and inverted phase C from the output of inverter 110. The three inputs of AND gate 112 all have logic "ones" only during the 60° time interval centered on the positive lobe of the phase A signal. During that 60° interval, the output signal of AND gate 112 is a logic one, and it is conducted to one input of an OR gate 114.

During that same 60° interval, the output of OR gate 114 is a logic one irrespective of the signal at the other input of OR gate 114. During the remaining 300 degrees of an electrical cycle, the output of AND gate 112 is a logic zero, so the OR gate 114 is under the control of the signal at its other input, namely the signal of terminal 88, which is a current error signal.

The output of OR gate 114 is connected to a first input 116 of a two-input AND gate 118. The other input 120 of the gate 118 receives its signals from the output of an inverter 122, whose input comes from another three-input AND gate 124. In a manner similar to that described above in connection with the AND gate 112, the AND gate 124 produces a logic one output for one 60° interval when phase A is at the middle 60° of its negative lobe. During that 60° interval, the inverter 122 applies a logic zero signal to terminal 120 of the AND gate 118, which has the effect of controlling the output of AND gate 118 irrespective of the signal at the other input 116. The AND gate 118 produces a logic zero at its output during that particular negative lobe 60-degree interval.

During the other two 120-degree intervals of a complete electrical cycle, the output of AND gate 118 is under the control of signals at the terminal 88, which are closed-loop error signals. The resulting waveform at the output of AND gate 118 is as shown in FIG. 5A. In an identical manner, the signals shown in FIGS. 5B and 5C are produced at the outputs of AND gates 126 and 128 for phases B and C respectively. In FIG. 5A the positive 60-degree clamping interval is designated by reference numeral 130, and the negative clamping interval by numeral 132.

The programmable logic array of FIG. 4 includes also an OR gate 134, which receives a logic one signal from the output of AND gate 112 during a 60-degree interval and receives another logic one input signal at its other input from AND gate 124 during a second 60-degree interval as described above. The output of OR gate 134 is connected to an inverter 136. The output of inverter 136 is therefore a logic zero during two 60-degree intervals of each cycle.

This output signal is conducted through an inverter 137 to an analog switch 138 shown on FIG. 2. The switch 138 short circuits the integrating capacitor 44 during both of the 60-degree clamping intervals. The integral error of phase A is therefore clamped to zero by the analog switch 138 throughout the time intervals when the associated gating state is constrained. The purpose of the clamping is to prevent any DC offset voltage or residual error signal in the capacitor 44 from causing the integrator 40 to acquire a large output level during the 60-degree intervals when the integrator is not directly controlling the gating signals.

In the same way, an OR gate 140, together with an inverter 142, FIG. 4, and an inverter 143 and an analog switch 144 of FIG. 2 perform a similar function for phase B. An analog switch 146 similarly clamps the integral error of phase C to zero during two 60-degree intervals per cycle, in response to a NOR gate 148, whose two inputs are the outputs of the inverters 136 and 142, in cascade with an inverter 149. In principal, phase C could have been controlled in the same manner as A and B. The only reason for NOR gate 148 was the lack of an additional PLA output.

Figure 6:
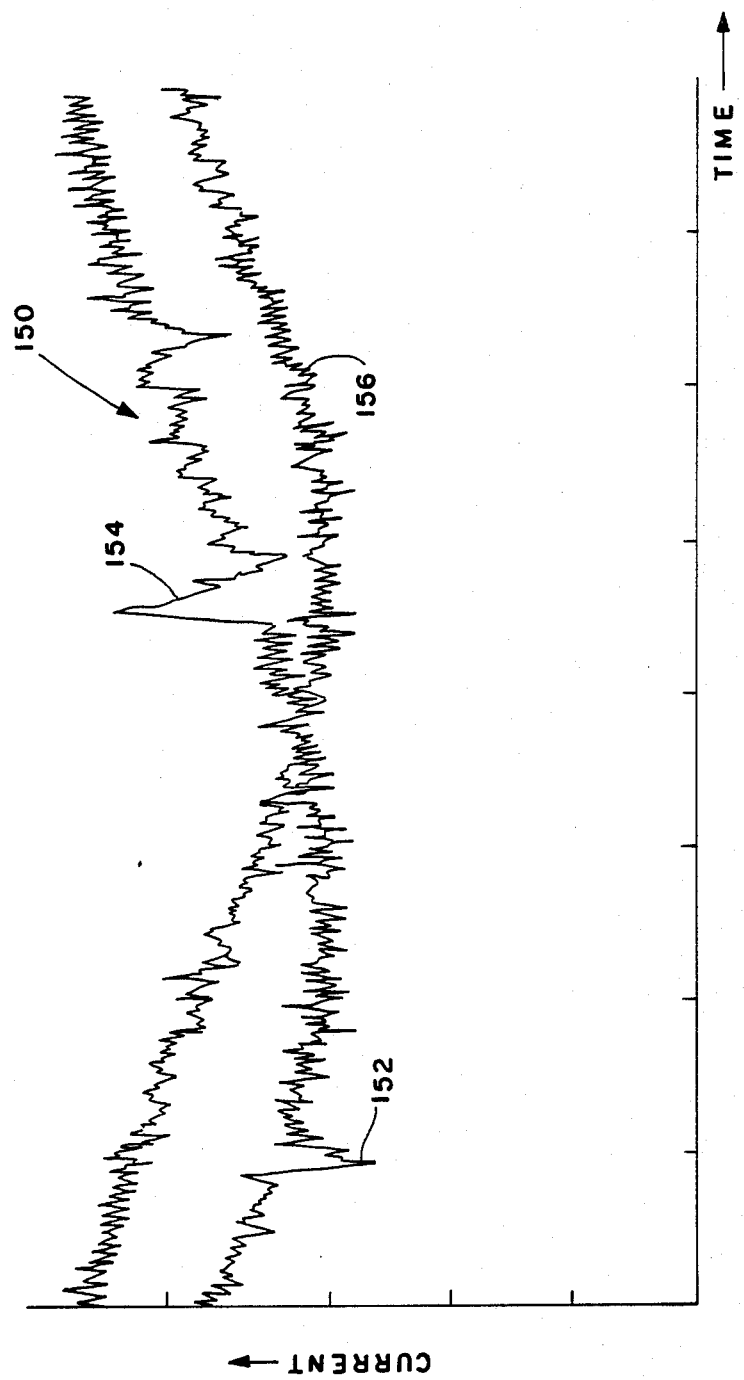
FIG. 6 reproduces time traces of controller output current with and without clamping of the error integrators.

FIG. 6 shows the effect of clamping the current error integrator 40 in a reset condition while the switching state of motor phase A is constrained. When the integrator reset (clamping) is not provided, the associated phase current develops a large error immediately after the constraint is removed from its phase. Curve 150 of FIG. 6, without a clamp, has two such error pulses, identified as pulses 152 and 154. Curve 156 of FIG. 6 is a time graph of the motor current of the same phase when the current error integrator is clamped in a reset condition during the two 60-degree intervals.

The gating signals of FIG. 5, which are derived by combining the comparator and microprocessor signals, are connected to the inputs of flip flops in the programmable logic array, FIG. 4. Each of these D flip-flops 158, 160, 162, 164, 166, 168 is associated with the gate of one of the inverter transistors. For example, 158 controls the gate of transistor 26a and 160 controls the gate of transistor 26d, both for phase A. These six D flip-flops are clocked by a fixed frequency clock signal, which is generated by a counter from the system clock in the microprocessor 2. The flip-flops are clocked in the present example at a frequency of 15 Khz.

The operation of the typical D flip-flop 158 is that if a logic one is present at the D input terminal upon clocking, the D flip-flop 158 is set. The internal set condition appears at its asserted and inverted output terminals Q and "not Q". A logic zero from "not Q" is then present at the A-plus output terminal 170. The others of the D flip-flops 158 through 168 operate in the same manner to produce signals at their inverted output terminals.

The D flip-flops 158 etc. have the effect of introducing a disturbance within the current control loop that reduces acoustic noise by preventing a fixed switching frequency. The "stationary" time reference of gating of the D flip-flops 158 etc. occurs in an essentially random time relationship to the current mode gating instants generated by the comparators (46, 68, 77) and to the current feedback's "frequency" of the inverter. Hence, there is a less fixed pattern of harmonics to generate motor noise. As shown on FIG. 4, the clock pulses that trigger the output latches 158, 160, 162, 164, 166, and 168 are not synchronized in any way with the stator frequency of the drive. The pulses are provided by a system clock in the microprocessor 2. Therefore, the phase angle within a stator frequency cycle at which new gating signals are provided by the latches 158 etc. varies from one cycle to the next. Thus not only are minimum ON and OFF times of the main semiconductors 26a etc. insured, but variation is introduced into the times of switching them. For this reason the noise produced by the system is irregular. The noise is primarily in the magnetic circuit structures. The resulting audible region noise of the motor resembles a hiss of the type associated with white noise instead of the objectionable whine which is normally associated with pulse-width modulated drives.

The input signal to comparator 210 is an analog signal that often resembles a triangular wave. When, in the comparator 210, it crosses a reference level in an increasing direction, the comparator outputs an upgoing edge of a square wave. When that analog signal is on a downward slope and crosses the reference level, the comparator 210 outputs a downgoing edge of its output square wave.

These edges, however, do not immediately gate the main semiconductors of the inverter (6). They must await the next occurrence of a clock pulse in the D flip-flops 158, etc. Hence the times of occurrence of the gating signals that ultimately trigger the main semiconductors are governed by two effects—the times of occurrence of the edges of the digital output of the comparator 210 and the times of occurrence of the clock pulses that enable the D flip-flops 158, etc.

Because changes in inverter gating signals are constrained to fixed time windows (controlled by a clock) which are not in synchronism with the upward and downward excursions of the current feedback signal $I_{fb}$, a cycle-to-cycle variation in inverter gating signals is introduced. The clock control produces windows or time intervals within which the current feedback control is able to provide a switching edge. The firing times of the main semiconductors 6 are affected by both the current feedback signals and the time windows of the D flip-flops 214 (FIG. 9A).

If employed in a conventional voltage-controlled inverter this technique would produce unacceptable motor currents exhibiting high peaks, a significant DC or sub-harmonic component, or beat frequencies. However, when current control is used instead, the current-control loop responds to these asynchronous gating constraints in the same manner as it would to a noise signal or other disturbance injected into the loop. That is, it automatically initiates a corrective action to insure that the motor current continues to track its reference. This corrective action takes the form of a perturbation in the instantaneous timing of the gating signals, as a result of current feedback. Thus any tendency for the control loop to oscillate at a fixed switching frequency is inhibited.

The motor drive is made relatively quiet, therefore, by spreading harmonics through the audible frequency range instead of concentrating them. A switching frequency tone can still be heard in the background. Its frequency increases with motor speed because the back EMF or motor speed voltage causes the current to decay more quickly during free-wheeling at higher speeds, so switching is more frequent.

The D flip-flops also insure that the on-time and off-time of the inverter power transistors is not less than a predetermined minimum. Minimum on-times and off-times are achieved by prohibiting changes of inverter switching states except at the ends of discrete predetermined time (clock) intervals.

The maximum switching rate is controlled in part by the clocking of the D flip-flops as just described and in greater measure by anti-overlap provisions in the gating circuit as described below.

The outputs such as 170 of the D flip-flops of FIG. 4 are connected to open-collector driver amplifiers 172,174,176,178,180 and 182 of FIG. 7. Amplifier 172 is typical. It operates in connection with a shunt capacitor 184 at its output, and a resistor 186 connected to a power supply VCC, to produce an asymmetrical delay of about 20 microseconds. The delay circuit's output signal is passed through an inverter 188 which drives a Darlington amplifier 190, whose output terminal 24a is connected to the gating circuits of the plus phase A power transmitter 26a, (i.e. we need isolation). The other five driver and time delay circuits are identical to the one just described.

The time delays produced by the capacitor 184 and its associated components prevent dangerous overlaps of "on" states within the inverter transistors, compensating for turn off delays inherent to present-day power transistors. This delay is the main factor in determining inverter switching frequency, because it permits the current error to overshoot its set point when the current error is being driven, before the inverter can react. This anti-overlap delay can, if desired, be made longer than is necessary for protection of the power circuit, in order to establish a maximum inverter switching frequency. Then no separate circuit is necessary in order to control the maximum switching frequency. The anti-overlap time delays in gating can be relied upon to perform this important function.

Figure 8:
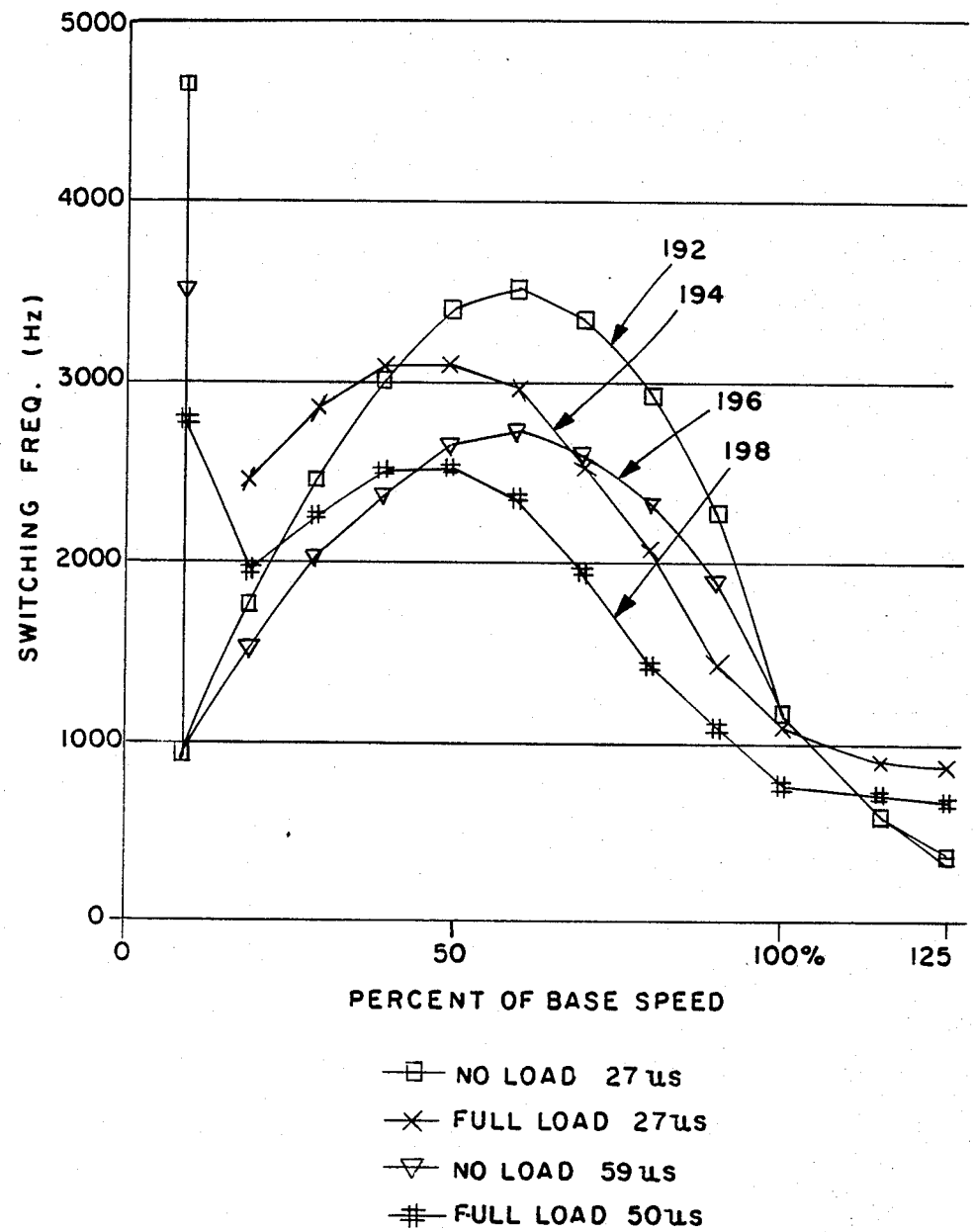
FIG. 8 has four graphs of inverter switching frequency as a function of base speed for various loads and anti-overlap delays.

The effects of anti-overlap delay on the inverter switching frequency are shown in FIG. 8. Four curves of switching frequency versus percentage of base speed are shown. The first curve, 192, shows a relatively high switching frequency corresponding to no-load operation of the motor with a 27 microsecond anti-overlap time delay in each of the six gating circuits. Curve 194 shows the switching frequency under full load motor conditions with the 27 microsecond time delay. Curve 196, which is significantly lower in frequency than curve 192, is the no-load switching characteristic with a 59 microsecond anti-overlap time delay. Curve 198 shows the full load characteristic with the 59 microsecond delay.

In a system like the present invention, in which the hysteresis of the gating comparators is substantially zero, there is no mechanism other than the noise-reducing D flip-flops 158, etc., to constrain the inverter switching frequency from becoming too high. The curves of FIG. 7 show that an increase in anti-overlap time delay from 27 to 59 microseconds causes a significant change in switching frequency by allowing a greater current error overshoot before a next transistor is turned on. These switching frequency curves peak at about half speed because that is the speed at which the rise and fall rates of the motor current are approximately equal. At lower speeds the current rises rapidly and falls slowly, while at higher speeds it rises slowly and falls rapidly, with, in both cases, the magnitude of the slowdown exceeding that of the speedup, relative to half speed conditions.

To make very clear the differences and advantages of the present method relative to the prior art, FIGS. 9A, 9B and 9C compare their structures and FIGS. 10A, 10B and 10C compare their performances. The microcomputer, which is in the prior art, is omitted from these diagrams.

FIG. 9A is a greatly simplified diagram showing certain features of the present invention. The current reference signal at 200 is compared with a current feedback signal 202 in a comparator 204. The current error signal at 206 is connected to a proportional plus integral (PI) amplifier 208, which has provision for its integrating capacitor to be disabled during 60-degree lockout intervals.

The output of the amplifier 208 is fed to a comparator 210 where no triangular modulating signal is superimposed. The comparator has high gain. Its output is connected to logic circuits 212, which provide for locking of two middle 60-degree time intervals during each cycle of each phase. At low speeds the lockout feature is disabled. The output of logic circuit 212 goes to D flip-flops 214 which are clocked to produce a pseudo-random distribution of noise harmonics through the audible spectrum. The outputs of the D flip-flops are connected to anti-overlap time delay circuits 216, which may, if desired, be used to establish a ceiling on the switching frequency. The outputs of delay circuits 216 drive the gates of the inverter transistors.

The combination of FIG. 9A solves the four generalized problems described above and enables excellent control of motor dynamics without sacrificing inverter voltage. At the same time it provides quiet motor operation and is implemented with a reasonably small amount of circuitry. The absence of any significant hysteresis, combined with high integral gain in 208 and a very high gain comparator 210 causes the steady state current errors to be sufficiently low that good performance of the system can be maintained up to almost full inverter voltage. Without the integrator the inverter output would not be able to approach full inverter voltage, because notches would be present outside of the center of the voltage waveform. It has been demonstrated in a laboratory that the integrator in the error path allows a substantially full square-wave operation.

In FIG. 9A, control of current in the three-phase motor is accomplished without excessive degrees of freedom. The system has a relatively low switching frequency. It has improved high fundamental frequency current regulation and low acoustic noise from the driven motor. The current feedback signal is compared with a fixed level, not with superimposed saw-toothed wave form. The circuitry is simple because no saw-toothed wave form is utilized.

With the corner of the Bode diagram of the proportional integrating amplifier located well above the inverter fundamental frequency and well below the switching frequency, the integral error term controls the fundamental frequency error, while the proportional term error controls the instants of inverter switching. Loop gain can be increased because of the absence of any superimposed saw-toothed wave. This results in lower current error.

The use in FIG. 9A of an integrator without a hysteresis comparator reduces the current error. The current mode control provides good current regulation with only three-phase switching and without artificial control of the individual gating pulses, which could result in a distorted output current. Good control is maintained at low switching frequencies by locking one phase at a time and controllig and sensing the other two phases.

FIG. 10A is an artist's conception of a commanded reference current for one phase of a motor controlled by the present invention, and of a resulting current that tracks the commanded current with relatively high fidelity. The gain is high, so the amplitude and phase errors are low. The switching perturbations are of relatively small amplitude and non-periodic in their switching frequency.

Figure 11A:
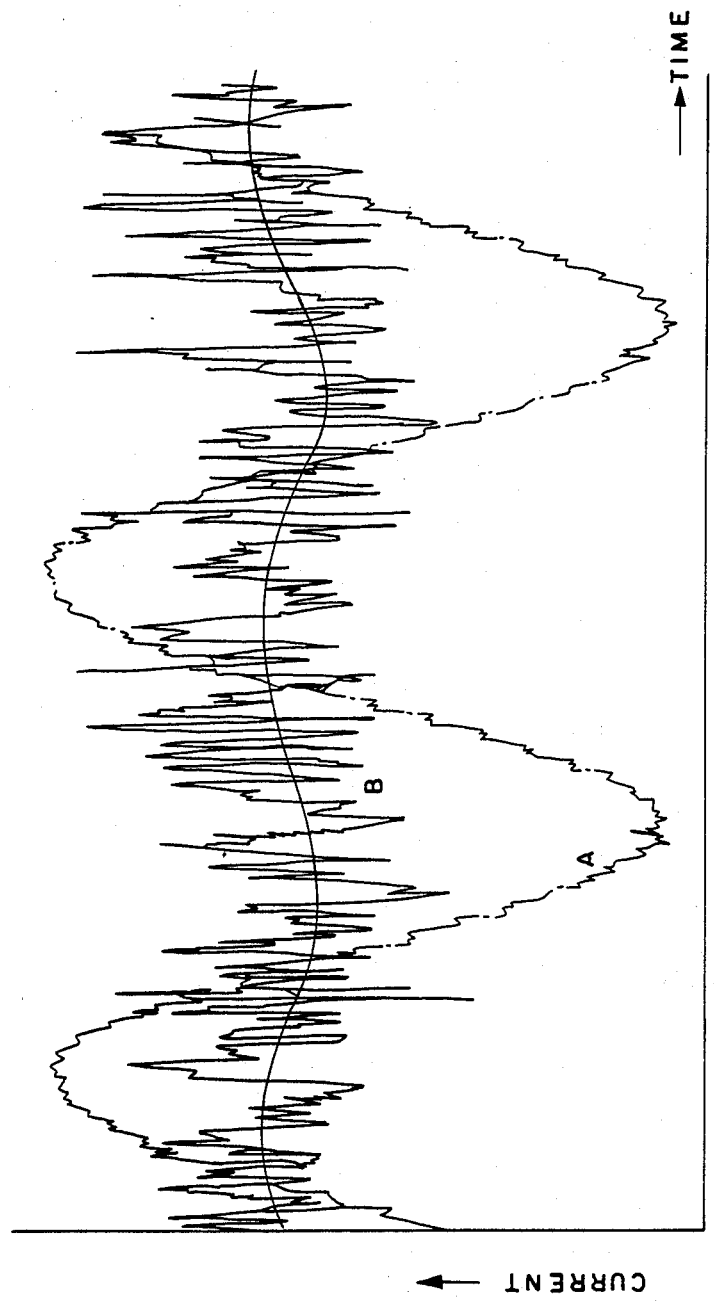

FIG. 11A is an oscilloscope showing a commanded current reference and an actual current error for the present invention, with a centerline of the current error sketched in on the figure.

FIG. 9B, by way of contrast, shows a hysteresis controller of the prior art. The comparator 218 has about 10% hysteresis. There is, or can be, a middle 60-degree lockout feature, but it would be applied only to the logic circuits 220. There is a selective anti-overlap delay 222. With this approach, the switching frequency is limited by comparator hysteresis and inductance. The other problems listed above are not solved. Note that because this system has no integrator, low-speed errors can be very great and the controller may be subject to sudden mode changes between a high switching frequency mode and a very low switching frequency mode.

FIG. 10B is an artist's conception of the reference current and actual current of a regulator of the hysteresis type of FIG. 9B. There are significant phase and amplitude errors at high speed. The switching frequency is high if lockout is not provided, and of moderate frequency with lockout. The hysteresis controller produced a distinct acoustic "whine" in the motor, and is therefore more objectionable.

FIG. 11B is an oscillogram showing a current reference signal and a current error signal, with the centerline of the current error signal superimposed, for the hysteresis controller. A significant error in both fundamental magnitude and phase can be observed. Switching frequency is much higher in FIG. 11B than in FIG. 11A. Comparison of the centerlines of the current error signals of FIGS. 11A and 11B also shows the superiority of the present invention over the hysteresis type of controller.

The system of FIG. 9C is the simplest and most common method of current control which deals with as many as three of the four major problems discussed above. FIG. 9C, depicting what is sometimes called a natural sampling approach, has a proportional integrating amplifier 224 and a triangular wave comparator 226, into which a triangular modulating wave 228 is introduced. The signal is not compared with a single-level signal but with a triangular wave form. The modulating triangular wave has a fixed frequency of several Khz.

The resultant lower loop gain makes it possible to maintain control over the switching sequence, while the frequency of the triangle establishes the inverter switching frequency. Thus, the effects of excessive switching freedom are avoided while adequate control of switching frequency is maintained. Since loop gain is lowered, this approach results in large errors unless the current error is integrated, as is usually done.

The system of FIG. 9C has the usual delay circuits 230 to delay the signals, enough to prevent transistor conduction overlap, before they are applied to the gates of the inverter transistors.

FIG. 10C is an artist's conception of the performance of the FIG. 9C type of apparatus. The phase and amplitude errors between the reference current wave and the expected actual current wave are controlled by the proportional plus integral regulator and are of moderate amplitude. The switching frequency of the inverter transistors is fixed and relatively high.

Because the gain of the natural sampling approach of FIG. 9C is low, the method is often unsuitable for motor control at high speeds. Moreover, the frequency components of the motor seem to concentrate near the triangular wave frequency, and the acoustic noise is very great.

The invention is applicable also to permanent magnet motors. Although a particular embodiment of the invention has been described, many others are possible utilizing the inventive concepts that are taught by the example.

I claim:
1. A controller that receives input commands for controllig a three phase induction motor powered by a dc power source comprising:
   a static inverter having controllable conduction means actuable into conduction by gating signals, for selectively connecting the positive and negative terminals of said dc source to the input terminals of said motor;
   reference means receiving said input commands, for providing current reference signals;
   current feedback means for sensing input currents to said motor and providing feedback signals accordingly;
   error signal means receiving said current reference signals and said current feedback signals for producing error signals in response thereto;
   threshold comparator means receiving said error signals for each phase and converting each of them to a digital signal by outputting a first digital level when the error signal for the phase is above a first predetermined threshold and a second digital level when it is below a second predetermined threshold;
   gating means responsive to occurrence of said first digital signal level for gating the controllable conduction means of said static inverter to a first state, in which current could be forced from said positive dc terminal to the motor; and responsive to occurrence of said second digital signal level for gating the controllable conduction means to a second state, in which current could be forced between said negative terminal and said motor;

means for tracking the position of the motor's flux and producing position signals in accordance with the position;

control means responsive to said input commands and to said position signals, for providing timing control signals;

locking means receiving said timing control signals, for overriding, in one phase at a time, the effects of said proportional plus integral signal by constraining said conduction means to said first state throughout the approximate middle 60° interval of the positive lobe of that phase and by constraining said conduction means to said second state throughout the approximate middle 60° interval of the negative lobe of that phase.

wherein said gating means comprises timing perturbation means for altering the starting times of said first and second states asynchronously with respect to the instantaneous phase of said reference signals, whereby acoustic noise of the motor is made less conspicuous by broader dispersion of the switching times.

2. A controller as defined in claim 1 and wherein said timing perturbation means comprises D flip-flops through which said digital levels are fed, said D flip-flops being clocked by a fixed frequency clock so as to introduce brief delays in the fine structure of the starting and stopping times of said levels.

3. A controller as defined in claim 1 and wherein said error signal means further comprises error processing means receiving said error signals and providing, at each of the three phase outputs of said error signal means, a proportional plus integral signal that is based on both a proportional component and an integrated component of the phase's error signal.

4. A controller as defined in claim 3 and wherein said first and second thresholds are close enough together to prevent them from introducing any significant hysteresis behavior other than, at most, noise immunity in the controller.

5. A controller that receives input commands for controlling a three phase induction motor powered by a dc power source comprising:

a static inverter having controllable conduction means actuable into conduction by gating signals, for selectively connecting the positive and negative terminals of said dc source to the input terminals of said motor;

reference means receiving said input commands, for providing current reference signals;

current feedback means for sensing input currents to said motor and providing feedback signals for phases accordingly;

error signal means receiving said current reference signals and said current feedback signals for producing error signals in response thereto;

threshold comparator means receiving said error signals for each phase and converting each of them to a digital signal by outputting a first digital level when the error signal for the phase is above a first predetermined threshold and a second digitial level when it is below a second predetermined threshold, said first and second thresholds being close enough together to prevent them from introducing any significant hysteresis behavior other than, at most, noise immunity in the controller;

gating means responsive to occurrence of said first digital signal level for gating the controllable conduction means of said static inverter to a first state, in which current could be forced from said positive dc terminal to the motor; and responsive to occurrence of said second digital signal level for gating the controllable conduction means to a second state, in which current could be forced between said negative terminal and said motor;

wherein said gating means comprises timing perturbation means for altering the starting times of said first and second states asynchronously with respect to the instantaneous phase of said reference signals, whereby acoustic noise of the motor is made less conspicuous by broader dispersion of the switching times;

said gating means further comprising asymmetrical delay means for delaying the start more than the stop, of conduction of said controllable conduction means in response to said digital signal levels, said delays being greater than the minimum delays required for preventing undesirable transient overlap of conduction of two or more said conduction means, and of sufficient duration to serve as the substantially sole means for limiting the frequency of gating of said inverter to below a predetermined maximum frequency.

6. A controller that receives input commands for controlling a three phase induction motor powered by a dc power source comprising:

a static inverter having controllable conduction means actuable into conduction by gating signals, for selectively connectig the positive and negative terminals of said dc source to the input terminals of said motor;

reference means receiving said input commands, for providing current reference signals;

current feedback means for sensing input currents to said motor and providing feedback signals accordingly;

error signal means receiving said current reference signals and said current feedback signals for producing error signals in response thereto;

error processing means receiving said error signals and providing, at each of its outputs, a proportional plus integral signal that is based on both a proportional component and an integrated component of a phase's error signal;

threshold comparator means receiving said proportional integral signal and converting it to a digital signal by outputting a first digital level when the proportional integral signal for the phase is above a first predetermined threshold and a second digital level when it is below a second predetermined threshold, wherein said first and second thresholds are close enough together to prevent them from introducing any significant hysteresis behavior other than, at most, noise immunity in the controller;

gating means responsive to occurrence of said first digital signal level for gating the controllable conduction means of said static inverter to a first state, in which current could be forced from said positive dc terminal to the motor; and responsive to occurrence of said second digital signal level for gating the controllable conduction means to a second state, in which current could be forced between said negative terminal and said motor;

said gating means comprising timing perturbation means for altering the starting times of said first and second states asynchronously with respect to the instantaneous phases of said reference signals, whereby acoustic noise of the motor is made less conspicuous by broader dispersion of the switching times, wherein said timing perturbation means comprises D flip-flops through which said digital levels are fed, said D flip-flops being clocked by a fixed frequency clock so as to be effectively pseudo-random in the fine structure of their starting and stopping times;

said gating means comprising asymmetrical delay means for delaying the start more than the stop, of conduction of said controllable conduction means in response to said digital signal levels, said delays being greater than the minimum delays required for preventing undesirable transient overlap of conduction of two or more of said conduction means, and of sufficient duration to serve as the substantially sole means for limiting the frequency of gating of said inverter to below a predetermined maximum frequency.

means for tracking the position of the motor's flux and producing position signals in accordance with the position;

control means responsive to said input commands and to said position signals, for providing timing control signals;

locking means receiving said timing control signals, for overriding, in one phase at a time, the effects of said proportional integral signal by constraining said conduction means to said first state throughout the approximate middle 60° interval of the positive lobe of that phase and by constraining said conduction means to said second state throughout the approximate middle 60° interval of the negative lobe of that phase;

clamping means responsive to said locking means to set, at least at the end of each of said 60° intervals, said integrated component of error signal to a level that causes no significant transient of motor current at the end of said 60° interval.

7. A controller that receives input commands for controlling an N-phase ac motor powered by a dc power source comprising:

a static inverter having controllable conduction means actuable into conduction by gating signals, for selectively connecting the positive and negative terminals of said dc source to the input terminals of said motor;

reference means receiving said input commands, for providing current reference signals;

current feedback means for sensing input currents to said motor and providing feedback signals accordingly;

error signal means receiving said current reference signals and said current feedback signals for producing error signals for phases in response thereto;

error processing means receiving said error signals and providing a proportional plus integral signal that is based on both a proportional component and an integrated component of a phase's error signal;

threshold comparator means receiving said proportional integral signal and converting it to a digital signal by outputting a first digital level when the proportional integral signal for the phase is above a first predetermined threshold and a second digital level when it is below a second predetermined threshold;

gating means responsive to occurrence of said first digital signal level for gating the controllable conduction means of said static inverter to a first state, in which current could be forced from said positive dc terminal to the motor; and responsive to occurrence of said second digital signal level for gating the controllable conduction means to a second state, in which current could be forced between said negative terminal and said motor;

wherein said gating means comprises timing perturbation means for altering the starting times of said first and second states asynchronously with respect to the instantaneous phase of said reference signals, whereby acoustic noises of the motor is made less conspicuous by broader dispersion of the switching times;

means for tracking the position of the motor's flux and producing position signals in accordance with the position;

control means responsive to said input commands and to said position signals, for providing timing control signals;

locking means receiving said timing control signals, for overriding, in one phase at a time, the effects of said proportional integral signal by constraining said conduction means to said first state throughout the approximate middle 180°/N interval of the positive lobe of that phase and by constraining said conduction means to said second state throughout the approximate middle 180°/N interval of the negative lobe of that phase;

clamping means responsive to said locking means to set, at least at the end of each of said 180°/N intervals, said integrated component of error signal to a level that causes no significant transient of motor current at the end of said 180°/N interval.

8. A controller as defined in claim 7 and wherein said first and second thresholds are close enough together to prevent them from introducing any significant hysteresis behavior other than, at most, noise immunity in the controller.

9. A drive system comprising:

a dc power source;

a three phase ac motor;

a static inverter having controllable conduction means actuable into conduction by gating signals, for selectively connecting the positive and negative terminals of said dc source to the input terminals of said motor;

a controller that receives input commands for controlling said motor, including reference means receiving said input commands, for providing current reference signals;

current feedback means for sensing input currents to said motor and providing feedback signals accordingly;

error signal means receiving said current reference signals and said current feedback signals for producing error signals for phases in response thereto;

error processing means receiving said error signals and providing a proportional plus integral signal that is based on both a proportional component and an integrated component of a phase's error signal;

threshold comparator means receiving said proportional integral signal and converting it to a digital signal by outputting a first digital level when the proportional integral signal for the phase is above a first predetermined threshold and a second digital level when it is below a second predetermined threshold.

gating means responsive to occurrence of said first digital signal level for gating the controllable conduction means of said static inverter to a first state, in which current could be forced from said positive dc terminal to the motor; and responsive to occurrence of said second digital signal level for gating the controllable conduction means to a second state, in which current could be forced between said negative terminal and said motor;

said gating means comprising timing perturbation means for altering the starting times of said first and second states asynchronously with respect to the instantaneous phases of said reference signals, whereby acoustic noise of the motor is made less conspicuous by broader dispersion of the switching times;

means for tracking the position of the motor's flux vector and producing position signals in accordance with the position;

control means responsive to said input commands and to said position signals, for providing timing control signals;

locking means receiving said timing control signals, for overriding, in one phase at a time, the effects of said proportional integral signal by constraining said conduction means to said first state throughout the approximate middle 60° interval of the positive lobe of that phase and by constraining said conduction means to said second state throughout the approximate middle 60° interval of the negative lobe of that phase.

10. A method for controlling a three phase induction motor powered by a dc power source comprising the steps of:

providing a static inverter having controllable conduction means actuable into conduction by gating signals, for selectively connecting the positive and negative terminals of said dc source to the input terminals of said motor;

receiving commands for control of the motor and generating phase current reference signals which, if matched by the phase currents of the motor, would drive the motor in such a way as to fulfill the commands;

sensing armature input currents to said motor and providing feedback signals indicative thereof;

combining said current reference signals and said current feedback signals to produce error signals for phase currents;

processing said error signals to provide a proportional plus integral signal that is based on both a proportional component and an integrated component of a phase's error signal;

responding to said proportional integral signal by producing a digital signal that has a first digital level when the proportional integral signal for the phase is above a first predetermined threshold and a second digital level when it is below a second predetermined threshold;

gating the controllable conduction means of said static inverter to a first state in response to occurrence of said first digital signal level, in which state current could be forced from said positive dc terminal to the motor; and gating the controllable conduction means to a second state in response to occurrence of said second digital signal level, in which state current could be forced between said negative terminal and said motor;

providing position signals in accordance with the angular position of the motor's flux;

providing timing control signals in response to said input commands and said position signals;

utilizing said timing control signals to override, in one phase at a time, the effects of said proportional plus integral signal by constraining said conduction means to said first state throughout the approximate middle 60° interval of the positive lobe of the current of that phase and by constraining said conduction means to said second state throughout the approximate middle 60° interval of the negative lobe of the current of that phase.

wherein said step of gating comprises introducing timing perturbations that alter the starting times of said first and second states asynchronously with respect to the instantaneous phase of said reference signals, whereby acoustic noise of the motor is made less conspicuous by broader dispersion of the switching times.

11. A method as defined in claim 10 and further comprising setting said first and second predetermined thresholds close enough together to prevent them from introducing any significant hysteresis behavior in the controller other than, at most, noise immunity.

* * * * *